(12) United States Patent
Shveidel

(10) Patent No.: US 11,055,029 B2
(45) Date of Patent: *Jul. 6, 2021

(54) EDGE CASE HANDLING IN SYSTEM WITH DYNAMIC FLOW CONTROL

(71) Applicant: EMC IP Holding Company LLC, Hopkinton, MA (US)

(72) Inventor: Vladimir Shveidel, Pardes-Hana (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 33 days.

This patent is subject to a terminal disclaimer.

(21) Appl. No.: 16/786,560

(22) Filed: Feb. 10, 2020

(65) Prior Publication Data
US 2020/0174709 A1 Jun. 4, 2020

Related U.S. Application Data

(63) Continuation of application No. 16/165,214, filed on Oct. 19, 2018, now Pat. No. 10,606,519.

(51) Int. Cl.
*G06F 3/06* (2006.01)
(52) U.S. Cl.
CPC .......... *G06F 3/0659* (2013.01); *G06F 3/0613* (2013.01); *G06F 3/0673* (2013.01)
(58) Field of Classification Search
CPC .... G06F 3/0659; G06F 3/0673; G06F 3/0613; G06F 3/067; G06F 3/061
See application file for complete search history.

(56) References Cited

U.S. PATENT DOCUMENTS

| 7,444,464 | B2 | 10/2008 | Urmston et al. |
| 7,765,307 | B1 * | 7/2010 | Kritov ............ H04L 69/14 709/228 |

(Continued)

FOREIGN PATENT DOCUMENTS

WO 2016111954 A1 7/2016

OTHER PUBLICATIONS

EMC Corporation, "Introduction to the EMC XtremIO Storage Array (Ver. 4.0): A Detailed Review," White Paper, Apr. 2015, 65 pages.

(Continued)

*Primary Examiner* — Hiep T Nguyen
(74) *Attorney, Agent, or Firm* — Ryan, Mason & Lewis, LLP

(57) ABSTRACT

A storage system includes a storage controller that is configured to receive an input-output (IO) request and to obtain a flow control window size of the storage system. The flow control window size is dynamically adjustable by the storage controller based at least in part on an IO latency of the storage system. The storage controller is configured, in response to determining that an actual size of a portion of the IO request to be processed is greater than the flow control window size, to add an entry corresponding to the portion of the IO request to a flow control queue of the storage system with an indication that the portion of the IO request has an effective size equal to the flow control window size. The storage controller is further configured to process the entry in the flow control queue corresponding to the portion of the IO request using the actual size of the portion of the IO request.

20 Claims, 6 Drawing Sheets

(56) References Cited

U.S. PATENT DOCUMENTS

| | | |
|---|---|---|
| 8,095,726 B1 | 1/2012 | O'Connell et al. |
| 8,214,612 B1 | 7/2012 | Natanzon |
| 9,104,326 B2 | 8/2015 | Frank et al. |
| 9,208,162 B1 | 12/2015 | Hallak et al. |
| 9,286,003 B1 | 3/2016 | Hallak et al. |
| 9,606,870 B1 | 3/2017 | Meiri et al. |
| 9,716,754 B2 | 7/2017 | Swift |
| 9,983,937 B1 | 5/2018 | Shveidel |
| 10,048,874 B1 | 8/2018 | Shveidel et al. |
| 2002/0122385 A1* | 9/2002 | Banerjee ............... H04L 1/0001 370/229 |
| 2007/0050504 A1 | 3/2007 | Gomez et al. |
| 2008/0144660 A1* | 6/2008 | Godlewski ............ H04L 47/193 370/468 |
| 2008/0279462 A1 | 11/2008 | Celi, Jr. |
| 2009/0132955 A1 | 5/2009 | Garg et al. |
| 2010/0179941 A1 | 7/2010 | Agrawal et al. |
| 2010/0315255 A1 | 12/2010 | Chang et al. |
| 2013/0325824 A1 | 12/2013 | Shoens |
| 2014/0181016 A1 | 6/2014 | Whitehead et al. |
| 2016/0150012 A1 | 5/2016 | Barszczak et al. |
| 2016/0170987 A1 | 6/2016 | Kesselman |
| 2016/0202927 A1 | 7/2016 | Klarakis et al. |
| 2016/0224259 A1 | 8/2016 | Ahrens et al. |
| 2017/0192857 A1 | 7/2017 | Meiri et al. |
| 2019/0332314 A1 | 10/2019 | Zhang et al. |

OTHER PUBLICATIONS

EMC Corporation, "Unstoppable Data Reduction: Always-on, In-Line, Zero-Penalty, Enterprise-Class, Free,"https://store.emc.com/xtremio, Jul. 2014, 2 pages.

EMC Corporation, "Introduction to XtremIO Virtual Copies," White Paper, Mar. 2016, 39 pages.

EMC Corporation, "XtremIO Data Production (XDP): Flash-Specific Data Protection, Provided by XtremIO (Ver. 4.0)," White Paper, Apr. 2015, 25 pages.

Dell EMC, "XtremIO v6.0 Specifications," Specification Sheet, 2017, 4 pages.

Dell EMC, "Dell EMC XtremIO X2: Next-Generation All-Flash Array," Data Sheet, 2017, 5 pages.

EMC Corporation, "High Availability, Data Protection and Data Integrity in the XtremIO Architecture," White Paper, Apr. 2015, 28 pages.

Y. Zhang et al., "End-to-End Integrity for File Systems: A ZFS Case Study," Proceedings of the 8th USENIX Conference on File and Storage Technologies (FAST), Feb. 23-26, 2010, 14 pages.

Dell EMC, "Introduction to Dell EMC XtremIO X2 Storage Array—A Detailed Review," Dell EMC White Paper, Aug. 2017, 46 pages.

N. Tolia et al., "Opportunistic Use of Content Addressable Storage for Distributed File Systems," Proceedings of the USENIX Annual Technical Conference, Jun. 9-14, 2003, 14 pages.

EMC Corporation, "EMC Recoverpoint Replication of XtremIO: Understanding the Essentials of RecoverPoint Snap-Based Replication for XtremIO," EMC White Paper, Aug. 2015, 31 pages.

Dell EMC, "Introduction to Dell EMC XtremIO X2 Storage Array—A Detailed Review," Dell EMC White Paper, Apr. 2018, 52 pages.

Dell EMC, "Introduction to XtremIO Metadata-Aware Replication," Dell EMC White Paper, Apr. 2018, 18 pages.

* cited by examiner

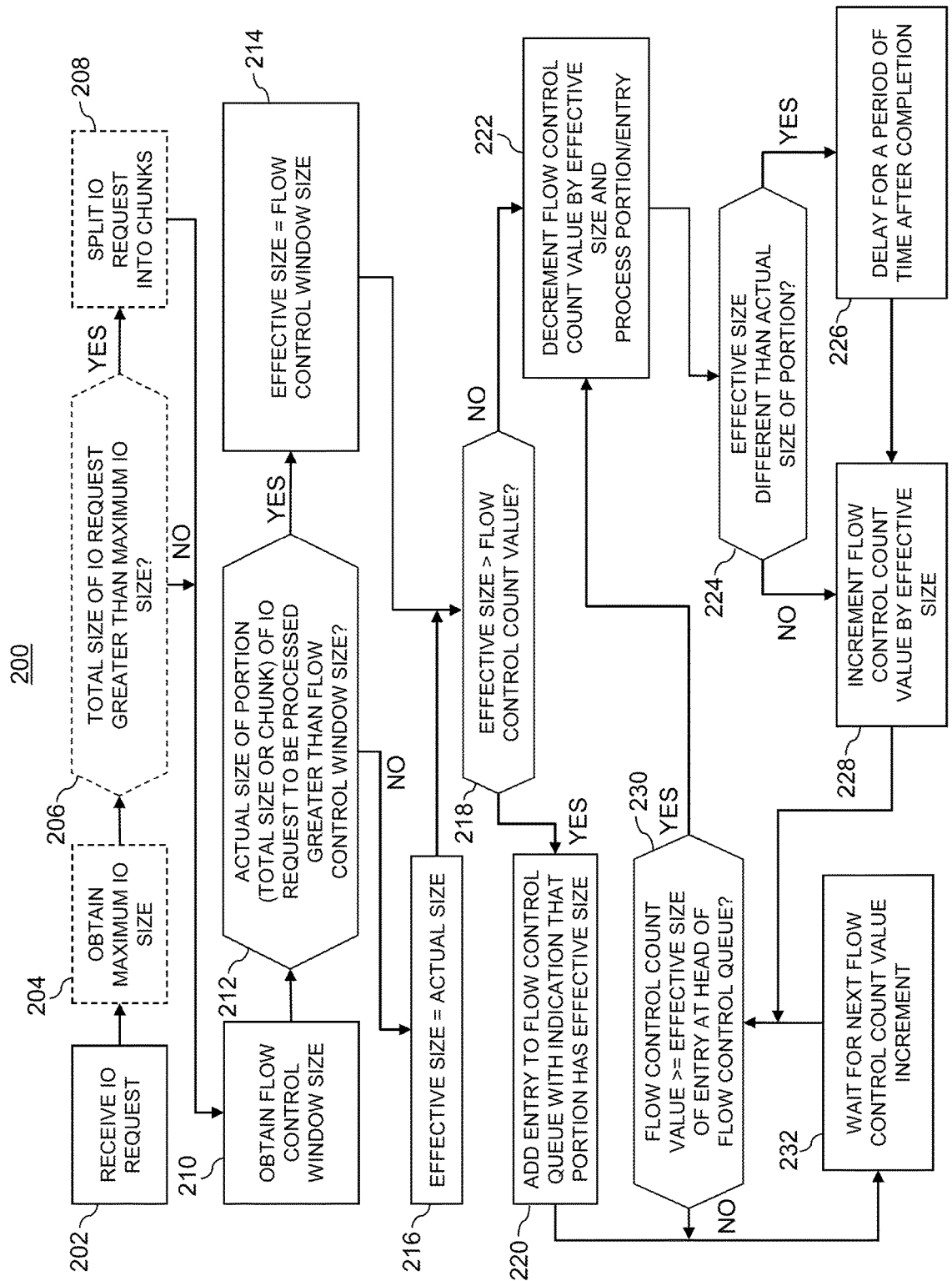

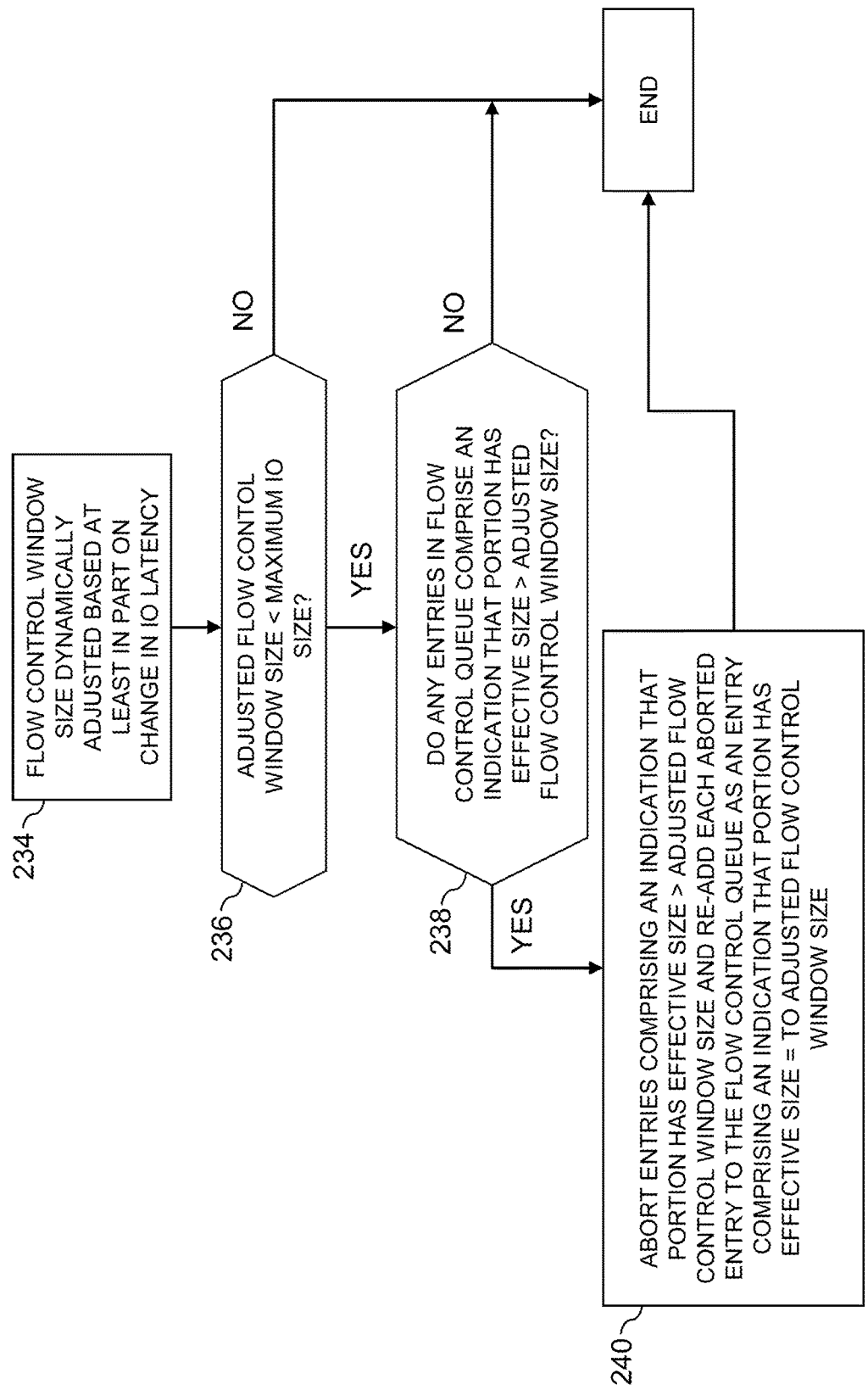

EDGE CASE HANDLING IN SYSTEM WITH DYNAMIC FLOW CONTROL

RELATED APPLICATION(S)

The present application is a continuation of U.S. patent application Ser. No. 16/165,214, filed Oct. 19, 2018, and entitled "Edge Case Handling in System with Dynamic Flow Control," which is incorporated by reference herein in its entirety.

FIELD

The field relates generally to information processing systems, and more particularly to storage in information processing systems.

BACKGROUND

In some information processing systems, a flow control mechanism may be used to limit the number of concurrent input-output (IO) requests or chunks of IO requests that are processed at the same time. The flow control mechanism typically includes a flow control window that defines a size that is available for the concurrent processing.

SUMMARY

Illustrative embodiments provide techniques for improved flow control in a storage system.

For example, in one embodiment, a storage system includes a plurality of storage devices and a storage controller associated with the plurality of storage devices. The storage controller is configured to receive an IO request and to obtain a flow control window size of the storage system where the flow control window size is dynamically adjustable by the storage controller based at least in part on an IO latency of the storage system. The storage controller is further configured to determine whether or not an actual size of a portion of the IO request to be processed by the storage controller is greater than the flow control window size and in response to determining that the actual size of the portion of the IO request is greater than the flow control window size, to add an entry corresponding to the portion of the IO request to a flow control queue of the storage system. The entry comprises an indication that the portion of the IO request has an effective size equal to the flow control window size. The storage controller is further configured to process the entry in the flow control queue corresponding to the portion of the IO request where the processing comprises processing the actual size of the portion of the IO request.

These and other illustrative embodiments include, without limitation, apparatus, systems, methods and processor-readable storage media.

BRIEF DESCRIPTION OF THE DRAWINGS

FIG. 2A is a flow diagram of a process for dynamic flow control in an illustrative embodiment.

FIG. 2B is a flow diagram of a process for dynamic flow control in an illustrative embodiment.

DETAILED DESCRIPTION

Figure 1:
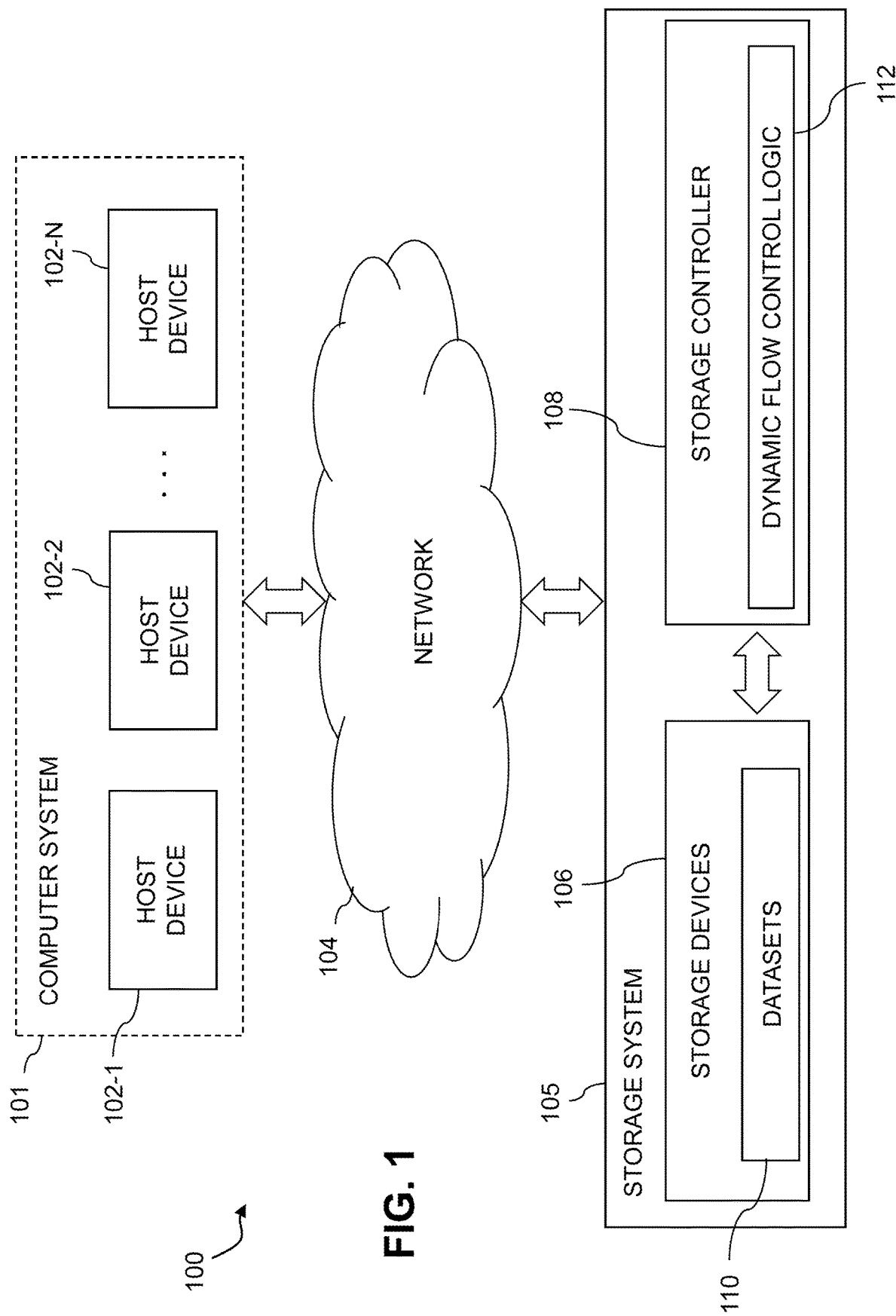
FIG. 1 is a block diagram of an information processing system comprising a storage system configured with functionality for dynamic flow control in an illustrative embodiment.

Information processing systems often use a flow control mechanism to prevent cluster overloading. Flow control mechanisms may be especially important in storage systems that have strong time constraints where a maximum allowed latency is guaranteed for the processing of each IO request.

The load of a storage system is typically defined by two parameters, the number of IO operations per second (IOPS) and the size of data involved in an IO request (IO size). As an example, an IO request for 512 kilobytes (KB) of data is a bigger burden on the storage system than an IO request for 8-KB of data. The flow control window size is typically defined in data size units, for example in 512-byte logical blocks. For example, the flow control window size may define the number of logical blocks that are allowed to be concurrently processed by the storage system.

Storage systems typically split large IO requests into smaller chunks for processing. For example, if the size of a large IO request is greater than the maximum IO size of the storage system, the large IO request is split into separate chunks each having no more than the maximum IO size. Each chunk may be processed by the storage system using a different thread with each chunk passing through the flow control mechanism independently.

In a typical case, the flow control window size is much greater than the maximum IO size and many chunks may be processed concurrently. This concurrent processing may occur even where multiple chunks have a size equal to the maximum IO size. For example, the flow control window size during typical operations may be four times, eight times, or any other amount larger than the maximum IO size. Because of the variability of the system load level, for example, based on the input pattern, the use of constant pre-configured thresholds for the flow control mechanism may not be sufficient. For example, an input pattern having "big reads" mixed with "small writes" or some other combination may use more processing resources of the cluster than another input pattern, even if this input pattern provides the same overall bandwidth.

A dynamic flow control mechanism may be implemented that dynamically adjusts the flow control window size based on end-to-end IO latency of the information processing system. For example, if the average IO latency of the system exceeds a predetermined upper threshold, the flow control window size may be decreased. Likewise, if the system is under-loaded with the average latency being less than predetermined lower threshold, the flow control window size may be increased. An example flow control mechanism that has a dynamic flow control window size which depends on average end-to-end latency of IO operations in the storage system is described in U.S. Pat. No. 10,048,874, the entirety of which is incorporated by reference herein.

In edge cases, e.g., situations where a significant or high percentage of the storage system resources are utilized by critical background tasks or otherwise not available for servicing IO requests, the average IO latency of the storage system may greatly increase. As an example, a double SSD failure in a RAID array may be an edge case that causes the IO latency of the system to greatly increase as the processing resources of the storage system are used to rebuild the RAID array or perform other actions.

During such a period of high average IO latency, the dynamic flow control mechanism will gradually decrease the flow control window size. As the flow control window size is decreased dynamically in response to the increase in IO latency, there may come a point where the flow control window size has decreased below the maximum IO size of the storage system. Since IO requests having a size greater than the maximum IO size are split into chunks having a size equal to or less than the maximum IO size, e.g., some chunks greater than the dynamically decreased flow control window size will be present, the chunks may become stuck in the flow control queue and unable to pass through the flow control mechanism due to the reduced flow control window size. This may in turn back up the flow control queue and inhibit other IO requests or chunks that have a size less than the flow control window size from passing through the flow control mechanism as well. For example, when the next IO request or chunk in the queue to be processed has a size larger than the flow control window size, it will effectively clog the queue and inhibit the remaining IO requests or chunks in the queue from being processed even if they have a size that is smaller than the flow control window size.

Illustrative embodiments provide techniques that implement dynamic flow control logic which is configured to allow the processing of IO requests or chunks in a manner that ensures that they do not inhibit the function of the flow control queue due to the flow control window size decreasing below the maximum IO size of the system. In some embodiments, for example, IO requests or chunks that have a size greater than the flow control window size may be added to the flow control queue as if they have a size equal to the flow control window size. For example, the entry in the flow control queue for such an IO request or chunk may comprise an indication that the size of the IO request or chunk is equal to the flow control window size rather than the actual size of the IO request or chunk. This may ensure that these IO requests or chunks are passed through the flow control mechanism as if they have the same size as the flow control window size and a flow control count value of the flow control mechanism may be decremented by the flow control window size. The IO requests or chunks will then be processed as normal by the storage system using their actual size and the flow control count value of the flow control mechanism may be incremented by the flow control window size upon completion of the processing. In some embodiments, to account for processing an IO request or chunk having an actual size that is larger than the flow control window size when the IO request or chunk is added to the flow control queue as if it has the same size as the flow control window size, the increment of the flow control count value by the flow control window size after completion of the processing may be delayed.

Such an embodiment provides for more efficient processing of IO requests and chunks during periods of high IO latency in the storage system when the flow control window size is dynamically reduced below the maximum IO size of the storage system, for example, by allowing IO requests and chunks having a size greater than the flow control window size to pass through the flow control mechanism in a serialized manner.

Illustrative embodiments will be described herein with reference to exemplary information processing systems and associated computers, servers, storage devices and other processing devices. It is to be appreciated, however, that these and other embodiments are not restricted to the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other cloud-based system that includes one or more clouds hosting multiple tenants that share cloud resources. Numerous different types of enterprise computing and storage systems are also encompassed by the term "information processing system" as that term is broadly used herein.

FIG. 1 shows an information processing system 100 configured in accordance with an illustrative embodiment. The information processing system 100 comprises a computer system 101 that includes host devices 102-1, 102-2, . . . 102-N. The host devices 102 communicate over a network 104 with a storage system 105. The computer system 101 is assumed to comprise an enterprise computer system, cloud-based computer system or other arrangement of multiple compute nodes associated with respective users. The host devices 102 of the computer system 101 in some embodiments illustratively provide compute services such as execution of one or more applications on behalf of each of one or more users associated with respective ones of the host devices 102.

The host devices 102 and storage system 105 illustratively comprise respective processing devices of one or more processing platforms. For example, the host devices 102 and the storage system 105 can each comprise one or more processing devices each having a processor and a memory, possibly implementing virtual machines and/or containers, although numerous other configurations are possible.

The host devices 102 and the storage system 105 can additionally or alternatively be part of cloud infrastructure such as an Amazon Web Services (AWS) system. Other examples of cloud-based systems that can be used to provide one or more of host devices 102 and storage system 105 include Google Cloud Platform (GCP) and Microsoft Azure.

The host devices 102 and the storage system 105 may be implemented on a common processing platform, or on separate processing platforms.

The host devices 102 are configured to write data to and read data from the storage system 105 in accordance with applications executing on those host devices 102 for system users.

The term "user" herein is intended to be broadly construed so as to encompass numerous arrangements of human, hardware, software or firmware entities, as well as combinations of such entities. Compute and/or storage services may be provided for users under a platform-as-a-service (PaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

The network 104 is assumed to comprise a portion of a global computer network such as the Internet, although other types of networks can be part of the network 104, including a wide area network (WAN), a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using Internet Protocol (IP) or other communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

The storage system 105 is accessible to the host devices 102 over the network 104. The storage system 105 comprises a plurality of storage devices 106 and an associated storage controller 108. The storage devices 106 store datasets 110, which may comprise logical storage volumes, snapshots or other arrangements of data.

The storage devices 106 illustratively comprise solid state drives (SSDs). Such SSDs are implemented using non-volatile memory (NVM) devices such as flash memory. Other types of NVM devices that can be used to implement at least a portion of the storage devices 106 include non-volatile random-access memory (NVRAM), phase-change RAM (PC-RAM) and magnetic RAM (MRAM). These and various combinations of multiple different types of NVM devices may also be used.

However, it is to be appreciated that other types of storage devices can be used in other embodiments. For example, a given storage system as the term is broadly used herein can include a combination of different types of storage devices, as in the case of a multi-tier storage system comprising a flash-based fast tier and a disk-based capacity tier. In such an embodiment, each of the fast tier and the capacity tier of the multi-tier storage system comprises a plurality of storage devices with different types of storage devices being used in different ones of the storage tiers. For example, the fast tier may comprise flash drives while the capacity tier comprises hard disk drives. The particular storage devices used in a given storage tier may be varied in other embodiments, and multiple distinct storage device types may be used within a single storage tier. The term "storage device" as used herein is intended to be broadly construed, so as to encompass, for example, flash drives, solid state drives, hard disk drives, hybrid drives or other types of storage devices.

In some embodiments, the storage system 105 illustratively comprises a scale-out all-flash content addressable storage array such as an XtremIO™ storage array from Dell EMC of Hopkinton, Mass. Other types of storage arrays, including by way of example VNX® and Symmetrix VMAX® storage arrays also from Dell EMC, can be used to implement storage system 105 in other embodiments.

The term "storage system" as used herein is therefore intended to be broadly construed and should not be viewed as being limited to content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage.

Other particular types of storage products that can be used in implementing storage system 105 in illustrative embodiments include all-flash and hybrid flash storage arrays such as Unity™ software-defined storage products such as ScaleIO™ and ViPR®, cloud storage products such as Elastic Cloud Storage (ECS), object-based storage products such as Atmos®, and scale-out NAS clusters comprising Isilon® platform nodes and associated accelerators, all from Dell EMC. Combinations of multiple ones of these and other storage products can also be used in implementing a given storage system in an illustrative embodiment.

The storage controller 108 of storage system 105 in the FIG. 1 embodiment includes dynamic flow control logic 112 which is configured to control performance of a dynamic flow control process such as that illustrated in the flow diagrams of FIGS. 2A and 2B.

The storage controller 108 and storage system 105 should also be understood to include additional modules and other components typically found in conventional implementations of storage controllers and storage systems, although such additional modules and other components are omitted from the figure for clarity and simplicity of illustration.

The host devices 102 and the storage system 105 may be implemented on respective distinct processing platforms, although numerous other arrangements are possible. For example, in some embodiments at least portions of the host devices 102 and the storage system 105 are implemented on the same processing platform. The storage system 105 can therefore be implemented at least in part within at least one processing platform that implements at least a portion of the host devices 102.

The term "processing platform" as used herein is intended to be broadly construed so as to encompass, by way of illustration and without limitation, multiple sets of processing devices and associated storage systems that are configured to communicate over one or more networks. For example, distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for the host devices 102 and storage system 105 to reside in different data centers. Numerous other distributed implementations of one or both of the host devices 102 and the storage system 105 are possible. Accordingly, the storage system 105 can also be implemented in a distributed manner across multiple data centers.

Additional examples of processing platforms utilized to implement host devices and/or storage systems in illustrative embodiments will be described in more detail below in conjunction with FIGS. 4 and 5.

It is to be appreciated that these and other features of illustrative embodiments are presented by way of example only and should not be construed as limiting in any way.

Accordingly, different numbers, types and arrangements of system components such as host devices 102, network 104, storage system 105, storage devices 106, storage controller 108 and datasets 110 can be used in other embodiments.

It should be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations.

For example, in other embodiments, functionality for the dynamic flow control logic can be implemented in one or more host devices, or partially in a host device and partially in a storage system. Accordingly, illustrative embodiments are not limited to arrangements in which all such functionality is implemented in a storage system or a host device, and therefore encompass various hybrid arrangements in which the functionality is distributed over one or more storage systems and one or more associated host devices, each comprising one or more processing devices.

Additional embodiments of dynamic flow control logic 112 will now be described. When a received IO request or a chunk of an IO request is passed through the flow control mechanism, the actual size of the IO request or chunk is compared to the flow control window size. If the actual size is greater than the flow control window size, the IO request or chunk is passed through the flow control mechanism with an indication that the size of the IO request or chunk has an effective size equal to the flow control window size. For example, if the flow control count is equal to or greater than the effective size, e.g., flow control window size, the IO request or chunk may be passed directly through the flow control mechanism as if it had a size equal to the flow control window size and may be processed. If the flow control count is less than the flow control window size, i.e., one or more other IO requests or chunks are currently being processed, the IO request or chunk is added as an entry to the flow control queue with an indication that the effective size is equal to the flow control window size in the manner described above.

When the IO request or chunk having an actual size greater than the flow control window size is passed through the flow control mechanism, either directly or via the flow control queue, and is processed, the flow control count value is decremented by the effective size of the IO request or chunk, e.g., the flow control window size, instead of the actual size. This guarantees that IO requests or chunks having an actual size greater than the flow control window size will be able to pass through the flow control mechanism directly or via the flow control queue without clogging the queue or inhibiting further processing of other IO requests or chunks. In these embodiments, the processing of IO requests or chunks having an actual size greater than the flow control window size is effectively serialized instead of being performed concurrently with the processing of other IO requests or chunks. This is because the full flow control window size is used to process the request, i.e., the flow control count value is decremented by the full flow control window size, e.g., decremented to zero, so no count value is left over for processing other IO requests or chunks at the same time.

In some embodiments, however, an IO request or chunk that is pending on the flow control queue prior to the decrease in the flow control window size may still clog the queue due to the decrease. As an example, if an IO request is received while the flow control window size is at a first size that is greater than the maximum IO size (or greater than the total size of the received request, if less than the maximum IO size), the IO request or chunk of the IO request (as split based on the maximum IO size) may be added to the flow control queue pending processing with its actual size. For example, if other IO requests or chunks are currently being processed and the flow control count value is less than the actual size of the IO request or chunk, the IO request or chunk may be added as an entry in the flow control queue.

If, after the IO request or chunk has been added to the flow control queue, the flow control window size is reduced from the first size to a second size which is smaller than the actual size of the IO request or chunk, the pending IO request or chunk may no longer pass through the flow control mechanism and may also inhibit other IO requests or chunks in the queue from passing through the flow control mechanism.

In an exemplary embodiment, dynamic flow control logic 112 addresses this scenario by issuing an abort return code to any IO requests or chunks in the queue that have a size greater than the second size. The abort return code releases the IO requests or chunks from the flow control queue. In response to the abort code, dynamic flow control logic 112 re-enters the aborted IO requests or chunks into the queue as if they have the reduced flow control size, e.g., the second size. For example, the entries in the flow control queue for the re-entered IO requests or chunks may include indications that the re-entered IO requests or chunks have an effective size equal to the reduced flow control size, e.g., the second size.

This technique guarantees that all IO requests or chunks waiting in the flow control queue will always have an effective size in the flow control queue that is less than or equal to the current flow control window size. This ensures that the IO requests or chunks in the flow control queue will not clog the flow control queue and that each IO request or chunk will pass through the flow control mechanism.

While the above techniques may provide a solution to IO requests or chunks having an actual size that is larger than the flow control window size, they may in some cases cause system overloading since it is the actual sizes of the IO requests or chunks that are being processed, not the effective sizes that are used to pass through the flow control mechanism. This is because the effective load of these IO requests or chunks for flow control purposes is based on the effective size and not the actual size. Therefore, the actual load that is created by these IO requests or chunks is greater than the expected load on the system as controlled by the flow control mechanism. This may be especially true in cases where all or a large portion of the incoming IO requests are either greater than the flow control window size or will be split into the maximum IO size chunks which are greater than the flow control window size.

In some embodiments, dynamic flow control logic 112 may implement techniques for preventing such overloading of the system due to the disparity between the effective size used for flow control purposes and the actual size that is processed. For example, instead of incrementing the flow control count value by the effective size upon completion of the processing of the IO request or chunk, a delay for a period of time may be introduced by dynamic flow control logic 112 before the increment of the flow control count value. This delay may also delay the processing of the next IO request or chunk which will allow the average system load level to be reduced. In some embodiments, the storage system may take advantage of this delay by allocating the system resources that would otherwise be dedicated to processing the next IO request to processing background threads. After the period of time for the delay has passed, the flow control count value is incremented as normal, e.g., using the effective value that was used for the IO request or chunk to pass through the flow control mechanism.

In some embodiments, the period of time for the delay may be calculated according to equation (1) below:

$$\text{delay} = \text{IO\_latency} * \left( \frac{(\text{actual\_size} - \text{effective\_size})}{\text{flow\_control\_window\_size}} \right) \quad (1)$$

where:
- IO_latency is the average IO latency of the storage system;
- actual_size is the actual size of the IO request or chunk;
- effective_size is the effective size at which the IO request is added to the flow control queue and passed through the flow control mechanism; and
- flow_control_window_size is the flow control window size.

According to equation (1), the delay will be zero in non-edge cases where the IO request is passed through the flow control mechanism with an effective size equal to the actual size of the IO request, e.g., the actual size is smaller than the flow control window size. In cases where the actual size is greater than the flow control windows size, the IO request is passed through the flow control mechanism with an effective size equal to the flow control window size, giving the delay a positive value in accordance with equation (1).

The techniques described above may be used to ensure that sufficient system resources are available for background processing during periods of high latency.

The operation of the information processing system 100 will now be described in further detail with reference to the flow diagrams of the illustrative embodiments of FIGS. 2A and 2B. The process 200 as shown includes steps 202 through 232 of FIG. 2A and steps 234 through 240 of FIG. 2B and is suitable for use in system 100 but is more generally applicable to other types of information processing systems in which a storage system is configured to perform dynamic flow control logic. The steps are illustratively performed at least in part under the control of the dynamic flow control logic 112 in storage system 105 of system 100. Some or all of the steps may be performed asynchronously where, for example, steps 234 through 240 may be performed by a different thread than the thread that performs steps 202 through 232 and may be performed concurrently with or at any other time relative to the performance of steps 202 through 232. Any other step may also or alternatively be performed asynchronously.

At 202, an IO request is received by the storage system 105, for example, from a host device 102.

At 204, in some embodiments, a maximum IO size of the storage system may be obtained by dynamic flow control logic 112. For example, dynamic flow control logic 112 may obtain the maximum IO size from storage controller 108 or any other portion of storage system 105.

At 206, dynamic flow control logic 112 determines whether or not the total size of the IO request is greater than the obtained maximum IO size. If the total size of the IO request is greater than the obtained maximum IO size, dynamic flow control logic 112 splits the IO request into chunks less than or equal to the obtained maximum IO size at 208 and the method proceeds to 210. If the total size of the IO request is not greater than the obtained maximum IO size, the method proceeds to 210 without splitting the IO request.

At 210, dynamic flow control logic 112 obtains the flow control window size, for example, from storage controller 108 or any other portion of storage system 105.

At 212, dynamic flow control logic 112 determines whether or not an actual size of a portion (e.g., total size if not split at 208, or size of a chunk if split at 208) of the IO request to be processed is greater than the obtained flow control window size.

At 214, if the actual size of the portion of the IO request is greater than the obtained flow control window size at 212, dynamic flow control logic 112 sets an effective size of the portion of the IO request equal to the flow control window size and the flow proceeds to 218.

At 216, if the actual size of the portion of the IO request is not greater than the obtained flow control window size at 212, dynamic flow control logic 112 sets the effective size of the portion of the IO request equal to the actual size and the flow proceeds to 218.

At 218, dynamic flow control logic 112 may determine whether or not the effective size is greater than a flow control count value of the flow control mechanism. If the effective size is greater than the flow control count value, an entry is added to the flow control queue with an indication that the portion of the IO request has the effective size at 220 and the method proceeds to 232. If the effective size is not greater than the flow control count value, the flow proceeds to 222.

At 222, dynamic flow control logic 112 decrements the flow control count value by the effective size and processes the portion of the IO request.

At 224, after or in conjunction with completion of the processing of the portion of the IO request, dynamic flow control logic 112 may determine whether or not the effective size for the portion of the IO request that was processed is different than the actual size of the portion. For example, if the effective size for the portion of the IO request was set to the flow control window size but the actual size for that portion is greater than the flow control window size, the dynamic flow control logic 112 may determine that the effective size is different, e.g., smaller, than the actual size, and the method may proceed to 226. At 226, a delay may be introduced for a period of time after completion of the processing, for example, as described above. After the delay, the method proceeds to 228.

At 228, if the indicated size is the same as the actual size at 224, or after the delay of 226, dynamic flow control logic 112 increments the flow control count value by the effective size.

At 230, dynamic flow control logic 112 may determine whether the flow control count value is greater than or equal to the effective size indicated by the next entry at the head of the flow control queue. If the flow control count value is not greater than or equal to the effective size of the next entry, the method proceeds to 232. If the flow control count value is greater than or equal to the effective size of the next entry, the method returns to 222, the flow control count value is decremented by the effective size indicated by the next entry, and the portion of the IO request corresponding to the next entry is processed.

At 232, dynamic flow control logic 112 waits for the next flow control count value increase. In response to an increase, the method proceeds to 230 for determination of whether the increased flow control count value is greater than or equal to the effective size of the entry at the head of the flow control queue as described above.

While FIG. 2A provides one example of a dynamic flow control process, the various steps illustrated in FIG. 2A need not be performed in the illustrated order or in some cases at all. For example, in some embodiments, steps 204, 206, and 208 may not be performed where, for example, the method may proceed directly to 210 from 202. In some embodiments, step 210 may be performed prior to step 204 or in any other order. While these modifications are provided as examples, other similar modification to the order or content of the process of FIG. 2A may be used.

Referring now to FIG. 2B, in response to a change in IO latency of the storage system, dynamic flow control logic 112 may dynamically adjust the flow control window size at

234. Such a change to IO latency may occur asynchronously at any time during the process of steps 202 through 232 or may occur at any other time.

At 236, dynamic flow control logic 112 determines whether or not the adjusted flow control window size is less than the maximum IO size of the storage system. If the adjusted flow control window size is not less than the maximum IO size, the method ends. If the adjusted flow control window size is less than the maximum IO size, the method proceeds to 238.

At 238, dynamic flow control logic 112 determines whether any entries in the flow control queue comprise an indication that the corresponding portion of an IO request has an effective size that is greater than the adjusted flow control window size. If there are no entries in the flow control queue with a corresponding effective size greater than the adjusted flow control window size, the method ends.

If there are any entries in the flow control queue with a corresponding effective size greater than the adjusted flow control window size, those entries are aborted such that they are removed from the flow control queue and re-added to the flow control queue as new entries each of which comprises an indication that the corresponding portion of the IO request has an effective size equal to the adjusted flow control window size at 240. The method then ends. As noted above, in some embodiments, the method illustrated in FIG. 2B may be an asynchronous process that is performed by a thread or other mechanism each time the flow control window size has been dynamically adjusted based at least in part on a change in IO latency.

Functionality such as that described in conjunction with the flow diagrams of FIGS. 2A and 2B can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

For example, a storage controller such as storage controller 110 of storage system 105 that is configured to control performance of one or more steps of the FIG. 2A and FIG. 2B processes in its corresponding system 100 can be implemented as part of what is more generally referred to herein as a processing platform comprising one or more processing devices each comprising a processor coupled to a memory. A given such processing device may correspond to one or more virtual machines or other types of virtualization infrastructure such as Docker containers or Linux containers (LXCs). The storage controller 110, as well as other system components, may be implemented at least in part using processing devices of such processing platforms. For example, in a distributed implementation of the storage controller 110, respective distributed modules of such a storage controller can be implemented in respective containers running on respective ones of the processing devices of a processing platform.

In some embodiments, the storage system comprises an XtremIO™ storage array or other type of content addressable storage system suitably modified to incorporate dynamic flow control techniques as disclosed herein.

An illustrative embodiment of such a content addressable storage system will now be described with reference to FIG. 3. In this embodiment, a content addressable storage system 305 comprises a plurality of storage devices 306 and an associated storage controller 308. The content addressable storage system 305 may be viewed as a particular implementation of the storage system 105, and accordingly is assumed to be coupled to host devices 102 of computer system 101 via network 104 within information processing system 100.

The storage controller 308 in the present embodiment is configured to implement dynamic flow control functionality of the type previously described in conjunction with FIGS. 1, 2A, and 2B.

The storage controller 308 includes dynamic flow control logic 314, which is configured to operate in a manner similar to that described above for dynamic flow control logic 112 of storage controller 110.

Figure 3:
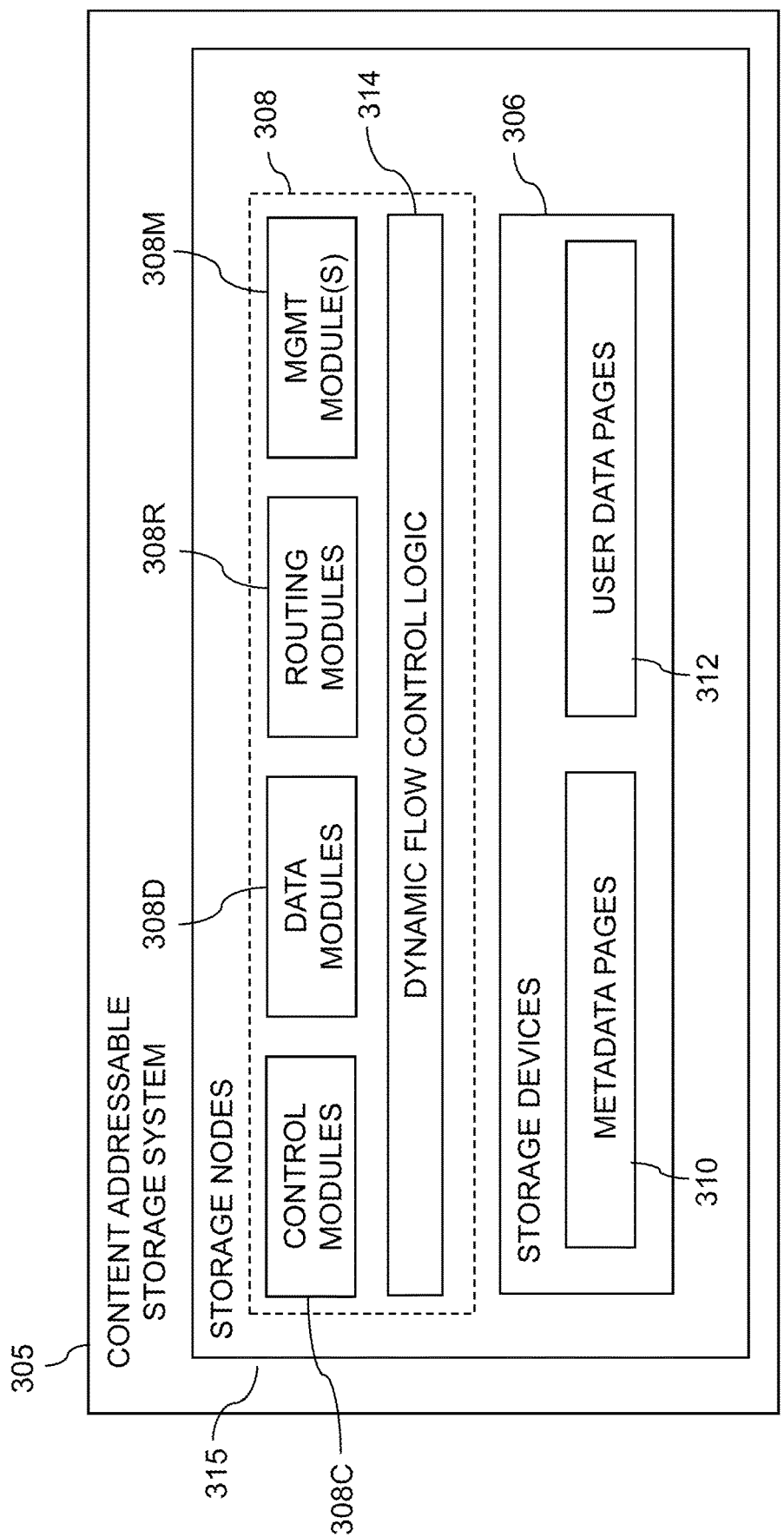
FIG. 3 shows a content addressable storage system having a distributed storage controller configured with functionality for dynamic flow control in an illustrative embodiment.

The content addressable storage system 305 in the FIG. 3 embodiment is implemented as at least a portion of a clustered storage system and includes a plurality of storage nodes 315 each comprising a corresponding subset of the storage devices 306. Other clustered storage system arrangements comprising multiple storage nodes can be used in other embodiments. A given clustered storage system may include not only storage nodes 315 but also additional storage nodes coupled to network 104. Alternatively, such additional storage nodes may be part of another clustered storage system of the system 100. Each of the storage nodes 315 of the storage system 305 is assumed to be implemented using at least one processing device comprising a processor coupled to a memory.

The storage controller 308 of the content addressable storage system 305 is implemented in a distributed manner so as to comprise a plurality of distributed storage controller components implemented on respective ones of the storage nodes 315. The storage controller 308 is therefore an example of what is more generally referred to herein as a "distributed storage controller." In subsequent description herein, the storage controller 308 may be more particularly referred to as a distributed storage controller.

Each of the storage nodes 315 in this embodiment further comprises a set of processing modules configured to communicate over one or more networks with corresponding sets of processing modules on other ones of the storage nodes 315. The sets of processing modules of the storage nodes 315 collectively comprise at least a portion of the distributed storage controller 308 of the content addressable storage system 305.

The modules of the distributed storage controller 308 in the present embodiment more particularly comprise different sets of processing modules implemented on each of the storage nodes 315. The set of processing modules of each of the storage nodes 315 comprises at least a control module 308C, a data module 308D and a routing module 308R. The distributed storage controller 308 further comprises one or more management ("MGMT") modules 308M. For example, only a single one of the storage nodes 315 may include a management module 308M. It is also possible that management modules 308M may be implemented on each of at least a subset of the storage nodes 315.

Each of the storage nodes 315 of the storage system 305 therefore comprises a set of processing modules configured to communicate over one or more networks with corresponding sets of processing modules on other ones of the storage nodes. A given such set of processing modules implemented on a particular storage node illustratively includes at least one control module 308C, at least one data module 308D and at least one routing module 308R, and possibly a management module 308M. These sets of processing modules of the storage nodes collectively comprise at least a portion of the distributed storage controller 308.

Communication links may be established between the various processing modules of the distributed storage controller 308 using well-known communication protocols such as IP, Transmission Control Protocol (TCP), and remote direct memory access (RDMA). For example, respective sets of IP links used in data transfer and corresponding messaging could be associated with respective different ones of the routing modules 308R.

Although shown as separate modules of the distributed storage controller 308, the dynamic flow control logic 314 in the present embodiment is assumed to be distributed at least in part over at least a subset of the other modules 308C, 308D, 308R and 308M of the storage controller 308. Accordingly, at least portions of the dynamic flow control logic 314 may be implemented in one or more of the other modules of the storage controller 308. In other embodiments, the dynamic flow control logic 314 may be implemented as stand-alone module of the storage controller 308.

The storage devices 306 are configured to store metadata pages 310 and user data pages 312 and may also store additional information not explicitly shown such as checkpoints and write journals. The metadata pages 310 and the user data pages 312 are illustratively stored in respective designated metadata and user data areas of the storage devices 306. Accordingly, metadata pages 310 and user data pages 312 may be viewed as corresponding to respective designated metadata and user data areas of the storage devices 306.

A given "page" as the term is broadly used herein should not be viewed as being limited to any particular range of fixed sizes. In some embodiments, a page size of 8-KB is used, but this is by way of example only and can be varied in other embodiments. For example, page sizes of 4-KB, 16-KB or other values can be used. Accordingly, illustrative embodiments can utilize any of a wide variety of alternative paging arrangements for organizing the metadata pages 310 and the user data pages 312.

The user data pages 312 are part of a plurality of logical unit numbers (LUNs) configured to store files, blocks, objects or other arrangements of data, each also generally referred to herein as a "data item," on behalf of users associated with host devices 102. Each such LUN may comprise particular ones of the above-noted pages of the user data area. The user data stored in the user data pages 312 can include any type of user data that may be utilized in the system 100. The term "user data" herein is therefore also intended to be broadly construed.

The content addressable storage system 305 in the embodiment of FIG. 3 is configured to generate hash metadata providing a mapping between content-based digests of respective ones of the user data pages 312 and corresponding physical locations of those pages in the user data area. Content-based digests generating using hash functions are also referred to herein as "hash digests." Such hash digests or other types of content-based digests are examples of what are more generally referred to herein as "content-based signatures" of the respective user data pages 312. The hash metadata generated by the content addressable storage system 305 is illustratively stored as metadata pages 310 in the metadata area. The generation and storage of the hash metadata is assumed to be performed under the control of the storage controller 308.

Each of the metadata pages 310 characterizes a plurality of the user data pages 312. For example, a given set of user data pages representing a portion of the user data pages 312 illustratively comprises a plurality of user data pages denoted User Data Page 1, User Data Page 2, . . . User Data Page n. Each of the user data pages in this example is characterized by a LUN identifier, an offset and a content-based signature. The content-based signature is generated as a hash function of content of the corresponding user data page. Illustrative hash functions that may be used to generate the content-based signature include the above-noted SHA1 hash function, or other secure hashing algorithms known to those skilled in the art. The content-based signature is utilized to determine the location of the corresponding user data page within the user data area of the storage devices 306.

Each of the metadata pages 310 in the present embodiment is assumed to have a signature that is not content-based. For example, the metadata page signatures may be generated using hash functions or other signature generation algorithms that do not utilize content of the metadata pages as input to the signature generation algorithm. Also, each of the metadata pages is assumed to characterize a different set of the user data pages.

A given set of metadata pages representing a portion of the metadata pages 310 in an illustrative embodiment comprises metadata pages denoted Metadata Page 1, Metadata Page 2, . . . Metadata Page m, having respective signatures denoted Signature 1, Signature 2, . . . Signature m. Each such metadata page characterizes a different set of n user data pages. For example, the characterizing information in each metadata page can include the LUN identifiers, offsets and content-based signatures for each of the n user data pages that are characterized by that metadata page. It is to be appreciated, however, that the user data and metadata page configurations described above are examples only, and numerous alternative user data and metadata page configurations can be used in other embodiments.

Ownership of a user data logical address space within the content addressable storage system 305 is illustratively distributed among the control modules 308C.

The dynamic flow control functionality provided by dynamic flow control logic 314 in this embodiment is assumed to be distributed across multiple distributed processing modules, including at least a subset of the processing modules 308C, 308D, 308R and 308M of the distributed storage controller 308.

For example, the management module 308M of the storage controller 308 may include dynamic flow control logic 314 that controls the control modules 308C and routing modules 308R in order to implement a dynamic flow control process.

In some embodiments, the content addressable storage system 305 comprises an XtremIO™ storage array suitably modified to incorporate techniques for performance of dynamic flow control functions.

In arrangements of this type, the control modules 308C, data modules 308D and routing modules 308R of the distributed storage controller 308 illustratively comprise respective C-modules, D-modules and R-modules of the XtremIO™ storage array. The one or more management modules 308M of the distributed storage controller 308 in such arrangements illustratively comprise a system-wide management module ("SYM module") of the XtremIO™ storage array, although other types and arrangements of system-wide management modules can be used in other embodiments. Accordingly, dynamic flow control functionality in some embodiments is implemented under the control of at least one system-wide management module of the distributed storage controller 308, utilizing the C-modules, D-modules and R-modules of the XtremIO™ storage array.

In the above-described XtremIO™ storage array example, each user data page has a fixed size such as 8-KB and its content-based signature is a 20-byte signature generated using an SHA1 hash function. Also, each page has a LUN identifier and an offset, and so is characterized by <lun_id, offset, signature>.

The content-based signature in the present example comprises a content-based digest of the corresponding data page. Such a content-based digest is more particularly referred to as a "hash digest" of the corresponding data page, as the content-based signature is illustratively generated by applying a hash function such as SHA1 to the content of that data page. The full hash digest of a given data page is given by the above-noted 20-byte signature. The hash digest may be represented by a corresponding "hash handle," which in some cases may comprise a particular portion of the hash digest. The hash handle illustratively maps on a one-to-one basis to the corresponding full hash digest within a designated cluster boundary or other specified storage resource boundary of a given storage system. In arrangements of this type, the hash handle provides a lightweight mechanism for uniquely identifying the corresponding full hash digest and its associated data page within the specified storage resource boundary. The hash digest and hash handle are both considered examples of "content-based signatures" as that term is broadly used herein.

Examples of techniques for generating and processing hash handles for respective hash digests of respective data pages are disclosed in U.S. Pat. No. 9,208,162, entitled "Generating a Short Hash Handle," and U.S. Pat. No. 9,286,003, entitled "Method and Apparatus for Creating a Short Hash Handle Highly Correlated with a Globally-Unique Hash Signature," both of which are incorporated by reference herein in their entirety.

As mentioned previously, storage controller components in an XtremIO™ storage array illustratively include C-module, D-module and R-module components. For example, separate instances of such components can be associated with each of a plurality of storage nodes in a clustered storage system implementation.

The distributed storage controller in this example is configured to group consecutive pages into page groups, to arrange the page groups into slices, and to assign the slices to different ones of the C-modules. For example, if there are 1024 slices distributed evenly across the C-modules, and there are a total of 16 C-modules in a given implementation, each of the C-modules "owns" 1024/16=64 slices. In such arrangements, different ones of the slices are assigned to different ones of the control modules 308C such that control of the slices within the storage controller 308 of the storage system 305 is substantially evenly distributed over the control modules 308C of the storage controller 308.

The D-module allows a user to locate a given user data page based on its signature. Each metadata page also has a size of 8-KB and includes multiple instances of the <lun_id, offset, signature> for respective ones of a plurality of the user data pages. Such metadata pages are illustratively generated by the C-module but are accessed using the D-module based on a metadata page signature.

The metadata page signature in this embodiment is a 20-byte signature but is not based on the content of the metadata page. Instead, the metadata page signature is generated based on an 8-byte metadata page identifier that is a function of the LUN identifier and offset information of that metadata page.

If a user wants to read a user data page having a particular LUN identifier and offset, the corresponding metadata page identifier is first determined, then the metadata page signature is computed for the identified metadata page, and then the metadata page is read using the computed signature. In this embodiment, the metadata page signature is more particularly computed using a signature generation algorithm that generates the signature to include a hash of the 8-byte metadata page identifier, one or more ASCII codes for particular predetermined characters, as well as possible additional fields. The last bit of the metadata page signature may always be set to a particular logic value so as to distinguish it from the user data page signature in which the last bit may always be set to the opposite logic value.

The metadata page signature is used to retrieve the metadata page via the D-module. This metadata page will include the <lun_id, offset, signature> for the user data page if the user page exists. The signature of the user data page is then used to retrieve that user data page, also via the D-module.

Write requests processed in the content addressable storage system 305 each illustratively comprise one or more IO operations directing that at least one data item of the storage system 305 be written to in a particular manner. A given write request is illustratively received in the storage system 305 from a host device, illustratively one of the host devices 102. In some embodiments, a write request is received in the distributed storage controller 308 of the storage system 305 and directed from one processing module to another processing module of the distributed storage controller 308. For example, a received write request may be directed from a routing module 308R of the distributed storage controller 308 to a particular control module 308C of the distributed storage controller 308. Other arrangements for receiving and processing write requests from one or more host devices can be used.

The term "write request" as used herein is intended to be broadly construed, so as to encompass one or more IO operations directing that at least one data item of a storage system be written to in a particular manner. A given write request is illustratively received in a storage system from a host device.

In the XtremIO™ context, the C-modules, D-modules and R-modules of the storage nodes 315 communicate with one another over a high-speed internal network such as an InfiniBand network. The C-modules, D-modules and R-modules coordinate with one another to accomplish various IO processing tasks.

The write requests from the host devices identify particular data pages to be written in the storage system 305 by their corresponding logical addresses each comprising a LUN ID and an offset.

As noted above, a given one of the content-based signatures illustratively comprises a hash digest of the corresponding data page, with the hash digest being generated by applying a hash function to the content of that data page. The hash digest may be uniquely represented within a given storage resource boundary by a corresponding hash handle.

The storage system 305 utilizes a two-level mapping process to map logical block addresses to physical block addresses. The first level of mapping uses an address-to-hash ("A2H") table and the second level of mapping uses a hash metadata ("HMD") table, with the A2H and HMD tables corresponding to respective logical and physical layers of the content-based signature mapping within the storage system 305.

The first level of mapping using the A2H table associates logical addresses of respective data pages with respective content-based signatures of those data pages. This is also referred to logical layer mapping.

The second level of mapping using the HMD table associates respective ones of the content-based signatures with respective physical storage locations in one or more of the storage devices 306. This is also referred to as physical layer mapping.

For a given write request, both of the corresponding HMD and A2H tables are updated in conjunction with the processing of that write request.

The A2H and HMD tables described above are examples of what are more generally referred to herein as "mapping tables" of respective first and second distinct types. Other types and arrangements of mapping tables or other content-based signature mapping information may be used in other embodiments.

The logical block addresses or LBAs of a logical layer of the storage system 305 correspond to respective physical blocks of a physical layer of the storage system 305. The user data pages of the logical layer are organized by LBA and have reference via respective content-based signatures to particular physical blocks of the physical layer.

Each of the physical blocks has an associated reference count that is maintained within the storage system 305. The reference count for a given physical block indicates the number of logical blocks that point to that same physical block.

In releasing logical address space in the storage system, a dereferencing operation is generally executed for each of the LBAs being released. More particularly, the reference count of the corresponding physical block is decremented. A reference count of zero indicates that there are no longer any logical blocks that reference the corresponding physical block, and so that physical block can be released.

It should also be understood that the particular arrangement of storage controller processing modules 308C, 308D, 308R and 308M as shown in the FIG. 3 embodiment is presented by way of example only. Numerous alternative arrangements of processing modules of a distributed storage controller may be used to implement dynamic flow control functionality in other embodiments.

Additional examples of content addressable storage functionality implemented in some embodiments by control modules 308C, data modules 308D, routing modules 308R and management module(s) 308M of distributed storage controller 308 can be found in U.S. Pat. No. 9,104,326, entitled "Scalable Block Data Storage Using Content Addressing," which is incorporated by reference herein. Alternative arrangements of these and other storage node processing modules of a distributed storage controller in a content addressable storage system can be used in other embodiments.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement host devices and storage systems with dynamic flow control functionality will now be described in greater detail with reference to FIGS. 4 and 5. Although described in the context of system 100, these platforms may also be used to implement at least portions of other information processing systems in other embodiments.

Figure 4:
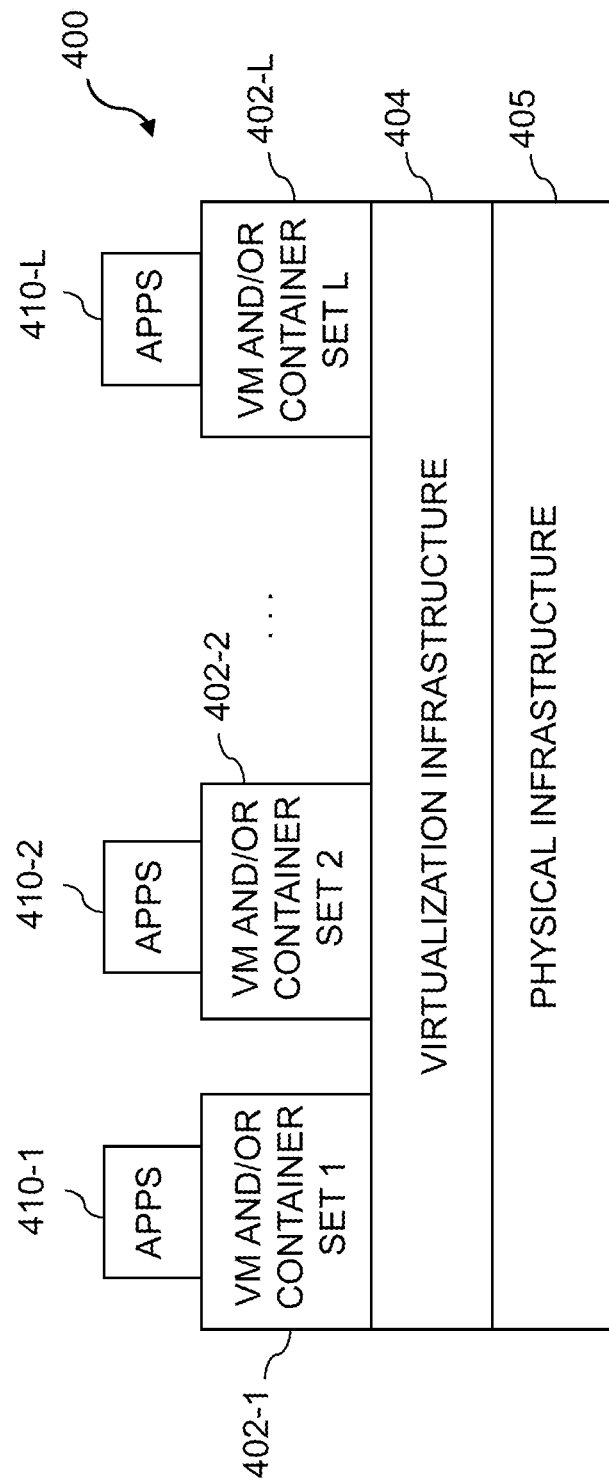
FIGS. 4 and 5 show examples of processing platforms that may be utilized to implement at least a portion of an information processing system in illustrative embodiments.
Figure 5:
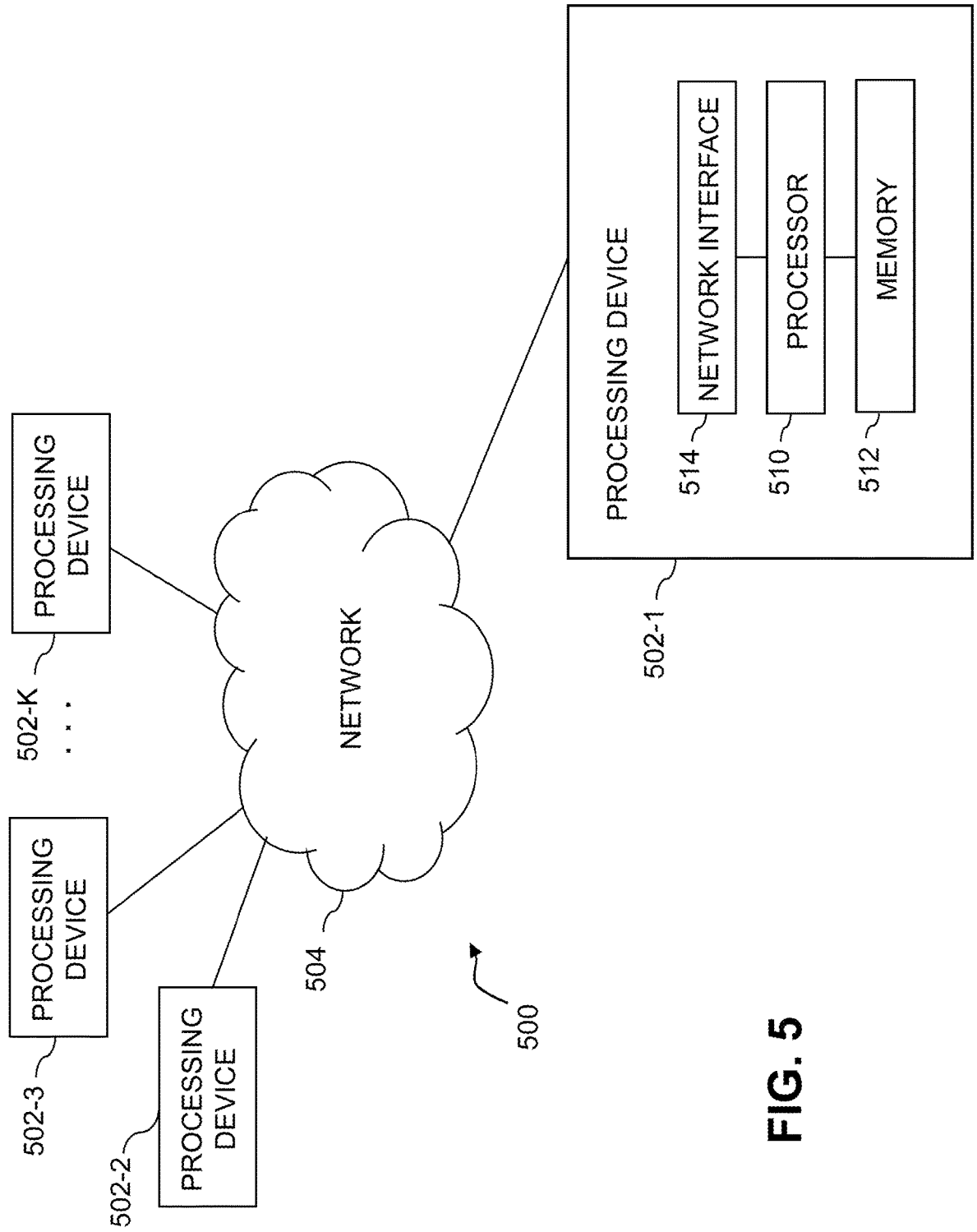

FIG. 4 shows an example processing platform comprising cloud infrastructure 400. The cloud infrastructure 400 comprises a combination of physical and virtual processing resources that may be utilized to implement at least a portion of the information processing system 100. The cloud infrastructure 400 comprises multiple virtual machines (VMs) and/or container sets 402-1, 402-2, . . . 402-L implemented using virtualization infrastructure 404. The virtualization infrastructure 404 runs on physical infrastructure 405, and illustratively comprises one or more hypervisors and/or operating system level virtualization infrastructure. The operating system level virtualization infrastructure illustratively comprises kernel control groups of a Linux operating system or other type of operating system.

The cloud infrastructure 400 further comprises sets of applications 410-1, 410-2, . . . 410-L running on respective ones of the VMs/container sets 402-1, 402-2, . . . 402-L under the control of the virtualization infrastructure 404. The VMs/container sets 402 may comprise respective VMs, respective sets of one or more containers, or respective sets of one or more containers running in VMs.

In some implementations of the FIG. 4 embodiment, the VMs/container sets 402 comprise respective VMs implemented using virtualization infrastructure 404 that comprises at least one hypervisor. Such implementations can provide dynamic flow control functionality of the type described above for one or more processes running on a given one of the VMs. For example, each of the VMs can implement dynamic flow control logic for providing dynamic flow control functionality in the system 100.

An example of a hypervisor platform that may be used to implement a hypervisor within the virtualization infrastructure 404 is the VMware® vSphere® which may have an associated virtual infrastructure management system such as the VMware® vCenter™. The underlying physical machines may comprise one or more distributed processing platforms that include one or more storage systems.

In other implementations of the FIG. 4 embodiment, the VMs/container sets 402 comprise respective containers implemented using virtualization infrastructure 404 that provides operating system level virtualization functionality, such as support for Docker containers running on bare metal hosts, or Docker containers running on VMs. The containers are illustratively implemented using respective kernel control groups of the operating system. Such implementations can also provide dynamic flow control functionality of the type described above. For example, a container host device supporting multiple containers of one or more container sets can implement one or more instances of the dynamic flow control logic.

As is apparent from the above, one or more of the processing modules or other components of system 100 may each run on a computer, server, storage device or other processing platform element. A given such element may be viewed as an example of what is more generally referred to herein as a "processing device." The cloud infrastructure 400 shown in FIG. 4 may represent at least a portion of one processing platform. Another example of such a processing platform is processing platform 500 shown in FIG. 5.

The processing platform 500 in this embodiment comprises a portion of system 100 and includes a plurality of processing devices, denoted 502-1, 502-2, 502-3, . . . 502-K, which communicate with one another over a network 504.

The network 504 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 502-1 in the processing platform 500 comprises a processor 510 coupled to a memory 512.

The processor 510 may comprise a microprocessor, a microcontroller, an application-specific integrated circuit (ASIC), a field-programmable gate array (FPGA) or other type of processing circuitry, as well as portions or combinations of such circuitry elements.

The memory 512 may comprise random access memory (RAM), read-only memory (ROM), flash memory or other types of memory, in any combination. The memory 512 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 502-1 is network interface circuitry 514, which is used to interface the processing device with the network 504 and other system components, and may comprise conventional transceivers.

The other processing devices 502 of the processing platform 500 are assumed to be configured in a manner similar to that shown for processing device 502-1 in the figure.

Again, the particular processing platform 500 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure such as VxRail™, VxRack™, VxRack™ FLEX, VxBlock™ or Vblock® converged infrastructure from VCE, the Virtual Computing Environment Company, now the Converged Platform and Solutions Division of Dell EMC.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the dynamic flow control functionality of one or more components of a storage system as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, host devices, storage systems, storage nodes, storage devices, storage controllers, dynamic flow control processes and associated control logic. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
    at least one processing device comprising a processor coupled to a memory, the at least one processing device being configured:
        to dynamically reduce a flow control window size of a storage system from a first size to a second size;
        to determine that an indicated size of an entry in a flow control queue of the storage system is greater than the second size;
        to modify the indicated size of the entry based at least in part on the determination that the indicated size of the entry is greater than the second size, the modification comprising setting the indicated size to be less than or equal to the second size.

2. The apparatus of claim 1, wherein setting the indicated size to be less than or equal to the second size comprises:
    removing the entry from the flow control queue based at least in part on the determination that the indicated size of the entry is greater than the second size; and
    adding the removed entry back to the flow control queue with an indicated size that is equal to or less than the second size.

3. The apparatus of claim 1, wherein the at least one processing device is further configured:
    to obtain a maximum input-output size of the storage system; and
    to determine that the second size is less than the maximum input-output size, wherein the determination that the indicated size of the entry in the flow control queue of the storage system is greater than the second size is based at least in part on the determination that the second size is less than the maximum input-output size.

4. The apparatus of claim 3, wherein the at least one processor is further configured:
    to determine whether or not a total size of a received input-output request is greater than the maximum IO size of the storage system; and
    in response to determining that the total size of the received input-output request is greater than the maximum IO size of the storage system, to split the received IO request into a plurality of chunks that are equal to or less than the maximum IO size of the storage system, the entry in the flow control queue corresponding to one of the chunks.

5. The apparatus of claim 4, wherein each chunk is processed by a separate thread of the at least one processing device.

6. The apparatus of claim 3, wherein the first size is equal to or greater than the maximum input-output size.

7. The apparatus of claim 1, wherein setting the indicated size to be less than or equal to the second size comprises setting the indicated size of the entry in the flow control queue to be less than an actual size of the entry.

8. A method comprising:
   dynamically reducing a flow control window size of a storage system from a first size to a second size;
   determining that an indicated size of an entry in a flow control queue of the storage system is greater than the second size;
   modifying the indicated size of the entry based at least in part on the determination that the indicated size of the entry is greater than the second size, the modification comprising setting the indicated size to be less than or equal to the second size;
   wherein the method is implemented by at least one processing device comprising a processor coupled to a memory.

9. The method of claim 8, wherein setting the indicated size to be less than or equal to the second size comprises:
   removing the entry from the flow control queue based at least in part on the determination that the indicated size of the entry is greater than the second size; and
   adding the removed entry back to the flow control queue with an indicated size that is equal to or less than the second size.

10. The method of claim 8, wherein the method further comprises:
    obtaining a maximum input-output size of the storage system; and
    determining that the second size is less than the maximum input-output size, wherein the determination that the indicated size of the entry in the flow control queue of the storage system is greater than the second size is based at least in part on the determination that the second size is less than the maximum input-output size.

11. The method of claim 10, wherein the method further comprises:
    determining whether or not a total size of a received input-output request is greater than the maximum IO size of the storage system; and
    in response to determining that the total size of the received input-output request is greater than the maximum IO size of the storage system, splitting the received IO request into a plurality of chunks that are equal to or less than the maximum IO size of the storage system, the entry in the flow control queue corresponding to one of the chunks.

12. The method of claim 11, wherein each chunk is processed by a separate thread of the at least one processing device.

13. The method of claim 10, wherein the first size is equal to or greater than the maximum input-output size.

14. The method of claim 8, wherein setting the indicated size to be less than or equal to the second size comprises setting the indicated size of the entry in the flow control queue to be less than an actual size of the entry.

15. A computer program product comprising a non-transitory processor-readable storage medium having stored therein program code of one or more software programs, wherein the program code when executed by at least one processing device causes the at least one processing device to:
    to dynamically reduce a flow control window size of a storage system from a first size to a second size;
    to determine that an indicated size of an entry in a flow control queue of the storage system is greater than the second size;
    to modify the indicated size of the entry based at least in part on the determination that the indicated size of the entry is greater than the second size, the modification comprising setting the indicated size to be less than or equal to the second size.

16. The computer program product of claim 15, wherein setting the indicated size to be less than or equal to the second size comprises:
    removing the entry from the flow control queue based at least in part on the determination that the indicated size of the entry is greater than the second size; and
    adding the removed entry back to the flow control queue with an indicated size that is equal to or less than the second size.

17. The computer program product of claim 15, wherein the program code further causes the at least one processing device:
    to obtain a maximum input-output size of the storage system; and
    to determine that the second size is less than the maximum input-output size, wherein the determination that the indicated size of the entry in the flow control queue of the storage system is greater than the second size is based at least in part on the determination that the second size is less than the maximum input-output size.

18. The computer program product of claim 17, wherein the program code further causes the at least one processing device:
    to determine whether or not a total size of a received input-output request is greater than the maximum IO size of the storage system; and
    in response to determining that the total size of the received input-output request is greater than the maximum IO size of the storage system, to split the received IO request into a plurality of chunks that are equal to or less than the maximum IO size of the storage system, the entry in the flow control queue corresponding to one of the chunks.

19. The computer program product of claim 17, wherein the first size is equal to or greater than the maximum input-output size.

20. The computer program product of claim 15, wherein setting the indicated size to be less than or equal to the second size comprises setting the indicated size of the entry in the flow control queue to be less than an actual size of the entry.

* * * * *